(12) United States Patent  
Gretz

(10) Patent No.: US 8,404,973 B1
(45) Date of Patent: Mar. 26, 2013

(54) CABLE ENTRY DEVICE FOR HIGH AND LOW VOLTAGE CABLES

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 383 days.

(21) Appl. No.: 12/925,797

(22) Filed: Oct. 29, 2010

Related U.S. Application Data

(63) Continuation-in-part of application No. 12/075,326, filed on Mar. 11, 2008, now Pat. No. 7,834,267.

(51) Int. Cl.
*H02G 3/14* (2006.01)
*H05K 5/03* (2006.01)

(52) U.S. Cl. ............... 174/66; 174/67; 174/53; 220/241; 220/242; 220/3.8; D13/177

(58) Field of Classification Search .................... 174/66, 174/67, 53, 480, 481, 135; 220/3.2, 3.5, 220/3.8, 241, 242; D8/350–353, 399; D13/156, D13/177, 152, 154, 158, 173, 169, 171, 146, D13/147, 162; 439/536
See application file for complete search history.

(56) References Cited

U.S. PATENT DOCUMENTS

| | | | |
|---|---|---|---|
| 4,688,747 A | | 8/1987 | Helmsdorfer et al. |
| 5,124,506 A | * | 6/1992 | Briggs et al. .................... 174/67 |
| D399,829 S | * | 10/1998 | Reed ........................... D13/156 |
| D503,156 S | | 3/2005 | Provenzano |
| D554,475 S | | 11/2007 | Gorin et al. |
| 7,390,964 B2 | * | 6/2008 | Gorin et al. ..................... 174/66 |
| 7,399,920 B2 | * | 7/2008 | Gorin et al. ..................... 174/66 |
| D577,280 S | * | 9/2008 | Parker ........................... D8/353 |
| D593,842 S | * | 6/2009 | Corbin .......................... D8/353 |
| 7,554,036 B1 | * | 6/2009 | DeCosta ......................... 174/66 |
| 7,563,979 B1 | | 7/2009 | Gretz |
| 7,654,405 B2 | | 2/2010 | Provenzano et al. |
| 7,820,911 B1 | * | 10/2010 | Gretz .............................. 174/66 |
| 7,834,267 B1 | * | 11/2010 | Gretz .............................. 174/66 |

* cited by examiner

*Primary Examiner* — Angel R Estrada

(57) ABSTRACT

A cable entry device for routing both power cables and low voltage cables through an electrical box. The cable entry device includes an elongated base with a front side, a rear side, two ends and a plurality of apertures in each end. The front side of the elongated base includes a base extension extending there from and a cable shield extending from the base extension. The cable shield includes a top and a bottom surface that are each at an angle of approximately 45 degrees with respect to the base. The top surface is closed and the bottom surface includes a circular opening that is sized to accommodate a conventional electrical fitting therein. A raised peripheral wall extends from the rear side of the elongated base.

11 Claims, 6 Drawing Sheets

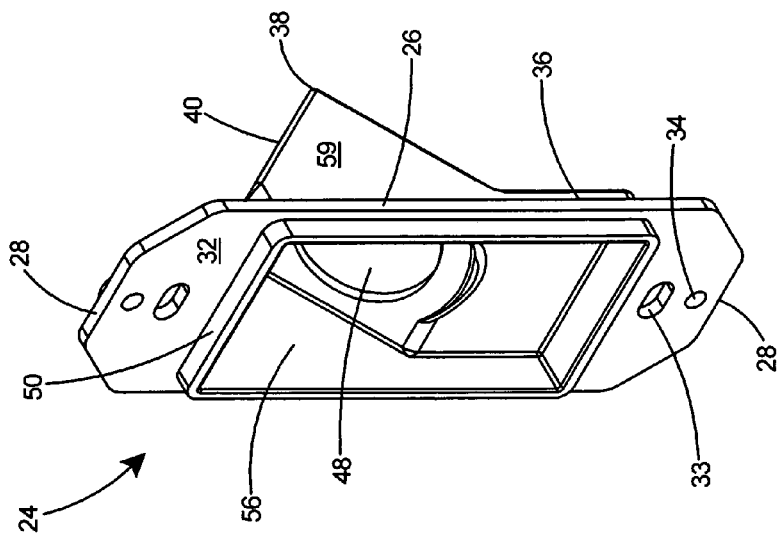
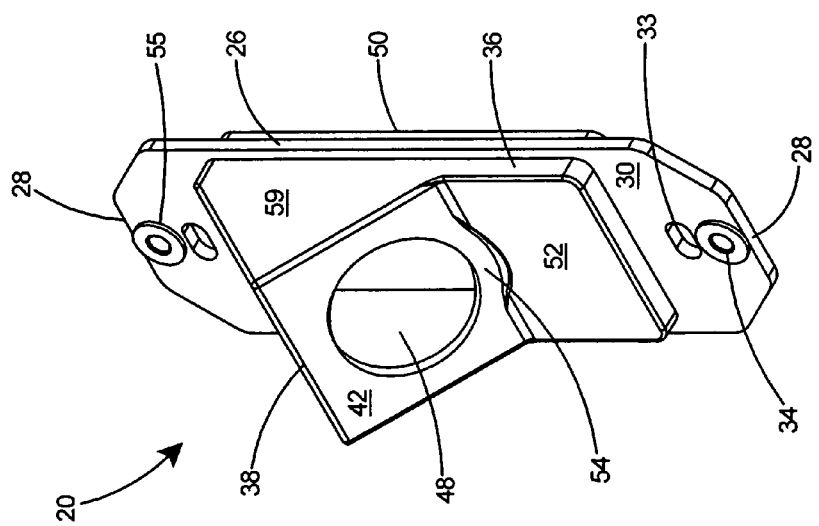

US 8,404,973 B1

CABLE ENTRY DEVICE FOR HIGH AND LOW VOLTAGE CABLES

This application is a Continuation-In-Part of U.S. patent application Ser. No. 12/075,326, filed on Mar. 11, 2008 now U.S. Pat. No. 7,834,267 and entitled "Reversible Protective Cable Chute with Cable Shield and Cover Plate", of which the entire contents of said application is incorporated herein in its entirety by reference thereto.

FIELD OF THE INVENTION

This invention relates to the installation of wiring in buildings and specifically to a cable entry device for routing power or low voltage electrical cables through interior walls.

BACKGROUND OF THE INVENTION

With the proliferation of wall mounted flat panel televisions it is frequently necessary to route power and low voltage cables to a wall location that is remote from existing wall electrical outlets. Power or line voltage must be routed to a point directly behind the television. Additionally, low voltage cables must be routed to the same location to connect cable or satellite TV signals or peripheral electronic equipment such as digital video recorders or wiring for home entertainment and surround sound systems.

In order to provide the TV with line and low voltage connections, homeowners frequently disrupt the walls surrounding the TV and are then faced with the task of repairing the walls. There are currently few options for routing both line voltage cables and low voltage cables through a common device in order to minimize the disruption of wall surfaces. Commonly owned U.S. patent application Ser. No. 12/075,326 disclosed a reversible cable entry device for accommodating low voltage cables.

What is needed is a single device for routing both high and low voltage cables through a wall to a newly installed flat panel TV or similar wall mounted electronic equipment. The cable entry device should work in conjunction with an existing or newly installed electrical box and enable the routing of both power cables and low voltage cables into the box. Providing a cable entry device that accommodates both high and low voltage cables would greatly expand the usefulness of the device.

SUMMARY OF THE INVENTION

The invention is a cable entry device for routing both power cables and low voltage cables through an electrical box. The cable entry device includes an elongated base with a front side, a rear side, two ends and a plurality of apertures in each end. The front side of the elongated base includes a base extension extending there from and a cable shield extending from the base extension. The cable shield includes a top and a bottom surface that are each at an angle of approximately 45 degrees with respect to the base. The top surface is closed and the bottom surface includes a circular opening that is sized to accommodate a conventional electrical fitting therein. A raised peripheral wall extends from the rear side of the elongated base.

OBJECTS AND ADVANTAGES

Several advantages are achieved with the cable entry device of the present invention, including:

(1) The cable entry device provides a device for routing either high voltage or low voltage cables through walls.
(2) The cable entry device provides a smooth 45° angle surface for power or low voltage cable connectors.
(3) The cable entry device can be used with a conventional electrical box or low voltage frame for providing cable passageways through walls.
(4) The cable entry device accommodates standard decorator-style wall plates.
(5) The cable entry device for a single gang electrical box does not require the manufacture of a specially designed cover plate.
(6) By using the cable entry device of the present invention, the installer may be able to utilize existing installed electrical boxes and low voltage frames for routing low voltage cables and thereby avoid installing additional electrical boxes or creating additional holes in the walls.

These and other objects and advantages of the present invention will be better understood by reading the following description along with reference to the drawings.

DESCRIPTION OF THE DRAWINGS

FIG. 2 is a front perspective view of a cable entry device according to the present invention.

FIG. 3 is a rear perspective view of a cable entry device according to the present invention.

Figure 1:
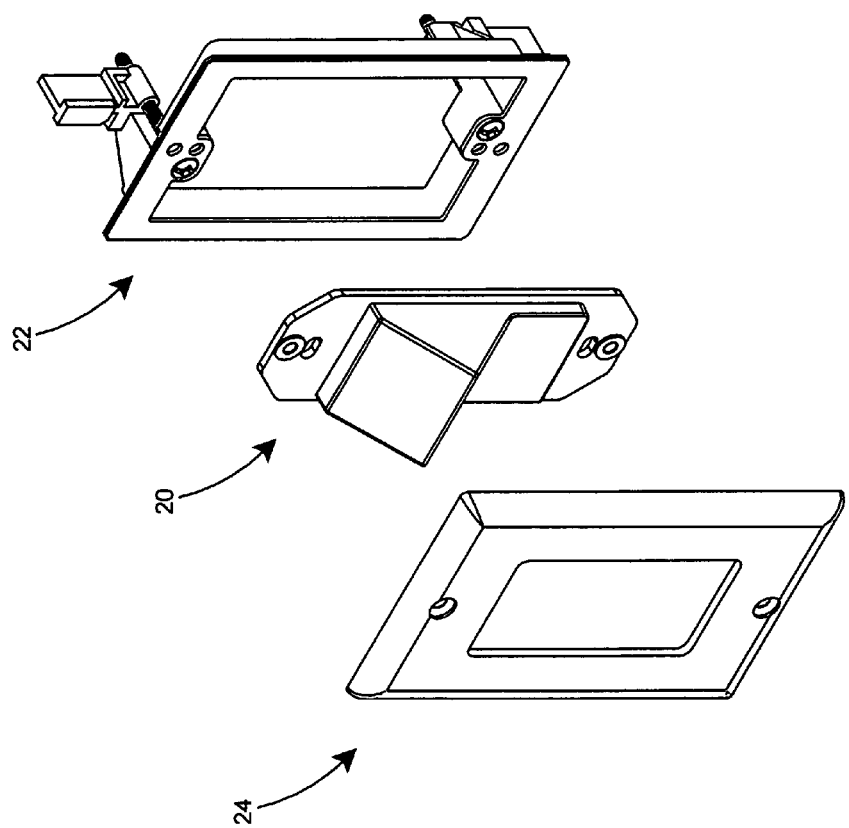
FIG. 1 is a perspective view of a preferred embodiment of a cable entry device according to the present invention in alignment with a low voltage bracket and a conventional decorative electrical cover plate.

| INDEX TO REFERENCE NUMERALS IN DRAWINGS | |
|---|---|
| 20 | cable entry device |
| 22 | low voltage frame |
| 24 | decorative cover plate |
| 26 | base |
| 28 | end of base |
| 30 | front side |
| 32 | rear side |
| 33 | inner aperture |
| 34 | outer aperture |
| 36 | base extension |
| 38 | cable shield |
| 40 | top surface |
| 42 | bottom surface |
| 48 | circular opening |
| 50 | raised peripheral wall |
| 52 | flat face |
| 54 | recessed area |
| 55 | boss |
| 56 | cavity |
| 58 | longitudinal axis of cable entry device |
| 59 | sidewall |
| 60 | wall |
| 62 | opening of decorative cover plate |
| 64 | electrical box |

-continued

INDEX TO REFERENCE NUMERALS IN DRAWINGS

| | |
|---|---|
| 66 | high voltage cable or cord |
| 68 | electrical fitting |
| 70 | low voltage cable |
| Θ1 | angle of top surface with respect to front side of base |
| Θ2 | angle of bottom surface with respect to front side of base |

DETAILED DESCRIPTION OF THE INVENTION

Referring to FIG. 1 there is shown a preferred embodiment of the present invention, a cable entry device 20, in alignment with a low voltage frame 22 and a conventional decorative cover plate 24 that it will be used in conjunction with. The cable entry device 20 is used for routing both power cables and low voltage cables through an electrical box.

With reference to FIGS. 2 and 3, the cable entry device 20 includes an elongated base 26 having two ends 28, a front side 30, and a rear side 32. The ends 28 of the base 26 include inner apertures 33 and outer apertures 34 therein. The front side 30 of the elongated base 26 includes a base extension 36 extending there from and a cable shield 38 extending from the base extension 36. The cable shield 38 includes a top surface 40 and a bottom surface 42 that are each at an angle of approximately 45 degrees with respect to the base 26. The top surface 40 is closed and the bottom surface 42 includes a circular opening 48 therein that is sized to accommodate a conventional electrical fitting (not shown) therein. A raised peripheral wall 50 extends from the rear side 32 of the elongated base 26. The lower portion of the base extension 36 is covered by a flat face 52. A recessed area 54 is provided in the flat face 52 of the base extension 36 in order to later provide sufficient space for the connection of a conventional electrical fitting (not shown) to the circular opening 48 in the bottom surface 42 of the cable shield 38. The recessed area 54 is preferably an arcuate shape. The outer apertures 34 are substantially circular in shape and the inner apertures 33 are slots that are substantially oval in shape. Bosses 55, integral with the front side 30 of the base 26, are provided surrounding each of the outer apertures 34. As shown in the view from the rear side 32 of the cable entry device 20 in FIG. 3, a substantially deep cavity 56 is provided behind the cable shield 38 to accommodate the later connection of an electrical fitting to the circular opening 48.

Figure 4:
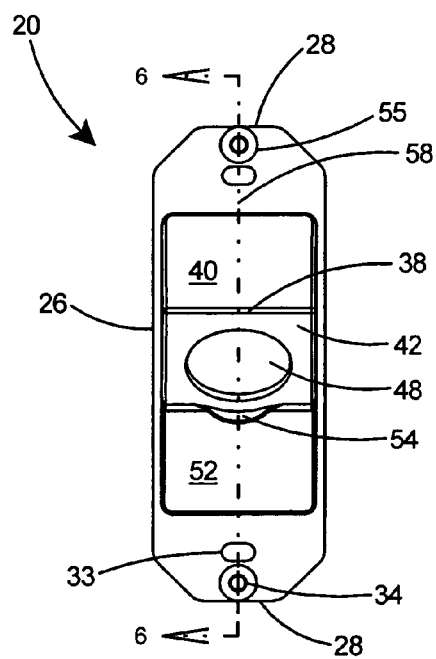
FIG. 4 is a front view of the cable entry device of FIG. 2.

As shown in FIG. 4, the cable entry device 20 is substantially symmetrical from side to side around the central longitudinal axis 58. In operation, the cable entry device 20 is typically mounted to an electrical box or low voltage frame (see FIG. 1) with the longitudinal axis 58 oriented vertically and with the top surface 40 of the outward extending cable shield 38 oriented upwards. Inner apertures 33 are slots that accommodate fasteners for securing the cable entry device 20 to the electrical box or low voltage frame. Outer apertures 34 are provided to accommodate fasteners for securing a decorative cover plate (see FIG. 1) to the electrical box or low voltage frame. The cable entry device 20 further includes sidewalls 59 extending between the top surface 40 and the bottom surface 42 of the cable shield 38.

Figure 5:
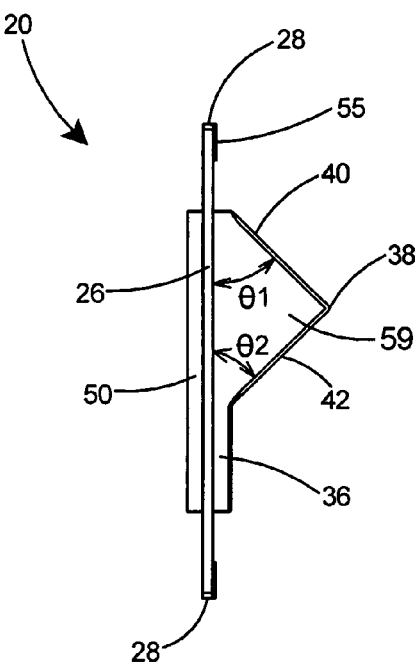
FIG. 5 is a side view of the cable entry device of FIG. 2.
Figure 6:
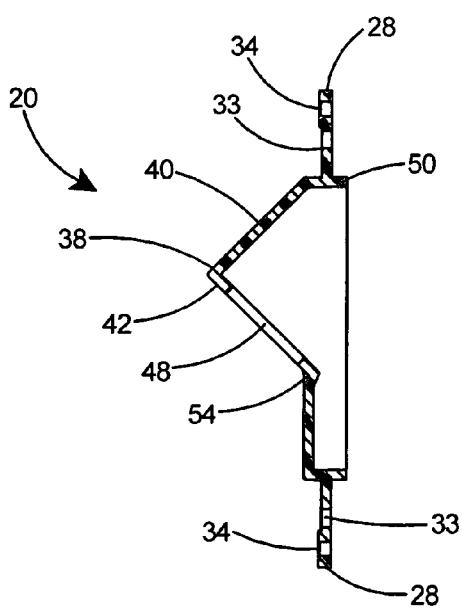
FIG. 6 is a sectional view of the cable entry device taken along line 6-6 of FIG. 4.
Figure 7:
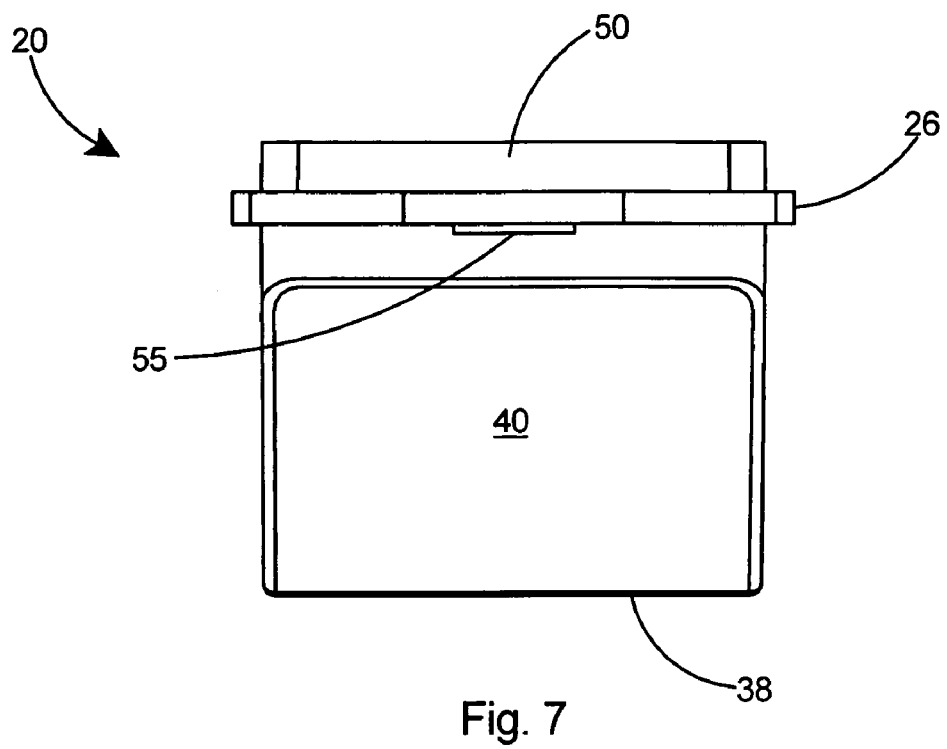
FIG. 7 is a top view of the cable entry device of FIG. 2.
Figure 8:
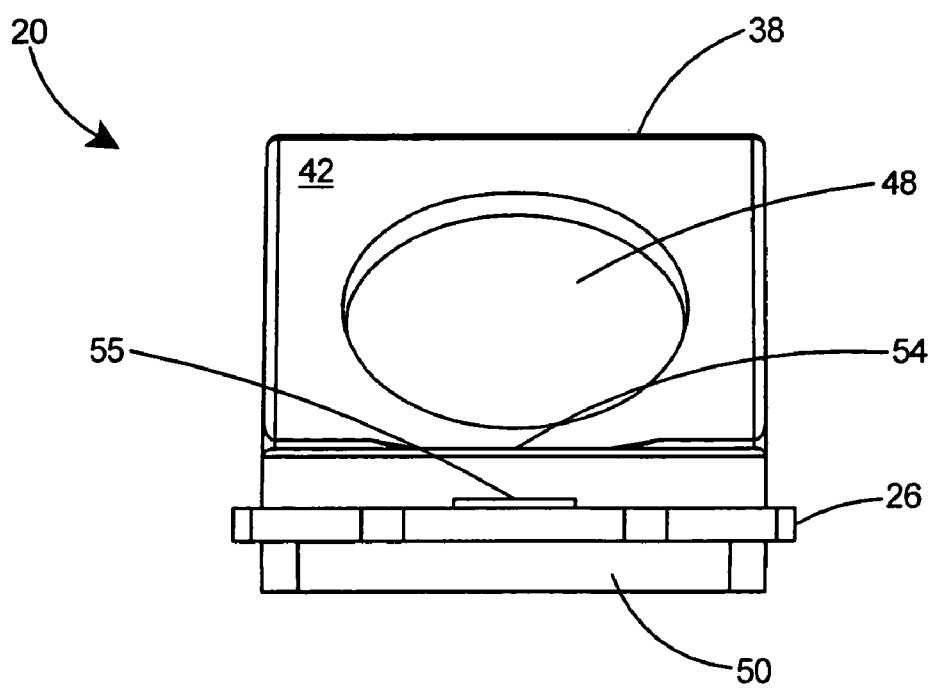
FIG. 8 is a bottom view of the cable entry device of FIG. 2.

With reference to FIGS. 4 and 5, the circular opening 48 is located in the bottom surface 42 of the cable shield 38. The opening 48 is capable of accepting low voltage cables or an electrical fitting (not shown) for stabilizing high voltage cables therein. As the cable entry device 20 of the present invention is typically mounted low on the wall, the top surface 40 of the cable shield 38 serves to block the view of the entry point of any low voltage cables or electrical fittings inserted within the circular opening 48. Preferably, the top surface 40 is at an angle of 35 to 55 degrees with respect to the front surface of the base 26 and, most preferably, at an angle of 45° with respect to the front surface of the base 26. The angle of the top surface 40 with respect to the front side 30 of the base 26 is shown by angle Θ1 in FIG. 5 and the angle of the bottom surface 42 with respect to the front side 30 of the base 26 is shown by angle Θ2. As the vantage point of an observer is typically above the mounting location of the cable entry device 20, the cable entry device 20 effectively blocks the view of the entry point of any low voltage cables or electrical fittings connected to the device thereby creating a cable entry portal that is more aesthetically pleasing to the view of the observer.

Figure 9:
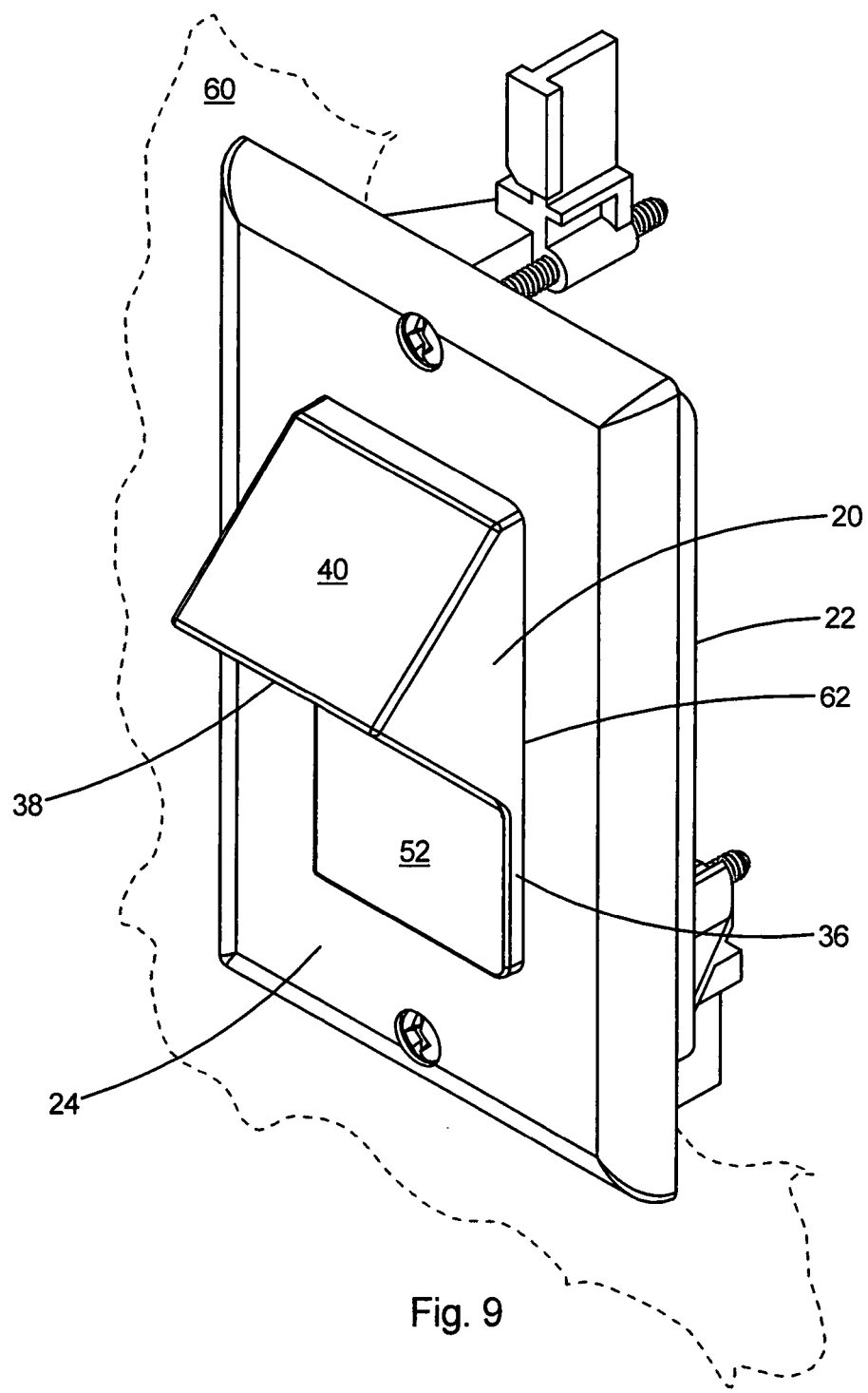
FIG. 9 is a perspective view of the cable entry device secured to a wall mounted low voltage frame.

With reference to FIG. 9, after being secured to a low voltage frame 22 or an electrical box (not shown) that has been secured to the wall 60, the cable entry device 20 is in turn secure with the wall 60. When secured to the low voltage frame 22, the base extension 36 and cable shield 38 extend through the opening 62 of the decorative cover plate 24 and substantially fill the cover plate opening 62.

Figure 10:
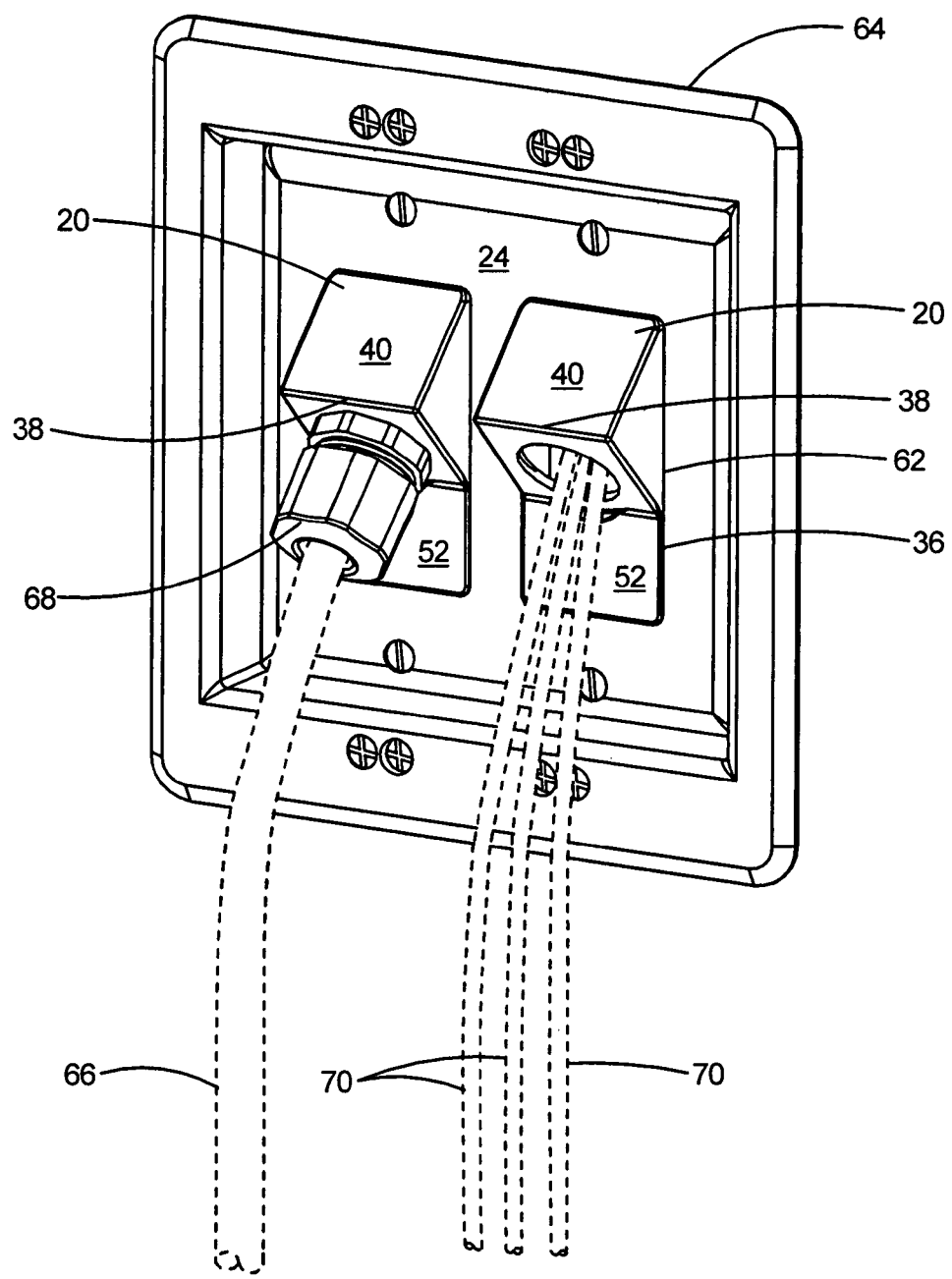
FIG. 10 is a perspective view of two cable entry devices according to the present invention secured to a wall mounted two-gang electrical box.

Referring to FIG. 10, the cable entry device 20 can be used in conjunction with a conventional electrical box 64 to provide an entryway for either high voltage or low voltage cables. The two-gang electrical box 64 in FIG. 10 illustrates operation of the cable entry device 20 for both a high and low voltage application. The cable entry device 20 on the left side of FIG. 10 illustrates a high voltage cable 66 secured to the electrical box 64 by an electrical fitting 68. The right side of FIG. 10 illustrates several low voltage cables 70 passing through the circular opening 48 in the bottom surface 42 of the cable entry device 20. The two-gang electrical box 64 is divided into two separate compartments, one for low voltage and one for high voltage. Electrical power is supplied to the left hand compartment by electrical cord 66, which is secured to the left hand cable entry device 20 by an electrical fitting 68. As shown on the right side of FIG. 10, low voltage cables 70 can be inserted directly into the low voltage compartment by passing them through the circular opening 48 in the right hand cable entry device 20. Electrical fittings 68, such as the LPCG50 Strain Relief Connector, available from Arlington Industries of Scranton, Pa., can be used for connecting high voltage cable 66 to the cable entry device 20. The electrical fitting 68 grips the electrical cord tightly and provides proper strain relief to prevent a backward force from pulling the electrical cord 66 out of the cable entry device 20 and electrical box 64 after it is connected thereto. By closing off the bottom opening with surface 42 and providing a circular opening 48 therein, the cable entry device 20 of the present invention has demonstrated beneficial and unexpected results in that it is useful for accommodating both high and low voltage cables.

The cable entry device 20 of the present invention may be constructed of metal or plastic. Most preferably, the cable entry device 20 is molded in one piece of plastic. The preferred plastic material for molding a cable entry device 20 according to the present invention includes polycarbonate, polyvinyl chloride, acrylonitrile-butadiene styrene, and polyethylene.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A cable entry device for routing one or more electrical cables through a wall comprising:
   an elongated base having two ends, a front side, and a rear side;
   said base including inner apertures and outer apertures at each end;
   a base extension extending from said front side of said base, said base extension including a flat face, said flat face of said base extension including a recessed area therein;
   a cable shield extending from said base, said cable shield including a top surface and a bottom surface; and
   a circular opening in said bottom surface of said cable shield.

2. The cable entry device of claim 1 wherein said top surface of said cable shield is at an angle of 35 to 55 degrees with respect to said front surface of said base.

3. The cable entry device of claim 1 wherein said top surface and said bottom surface of said cable shield are at an angle of 45 degrees with respect to said front surface of said base.

4. The cable entry device of claim 1 wherein said cable shield includes sidewalls extending between said top surface and said bottom surface.

5. The cable entry device of claim 1 including a boss on said base surrounding each of said outer apertures.

6. The cable entry device of claim 1 wherein said circular opening in said bottom surface of said cable shield is sized to accommodate a conventional electrical fitting therein.

7. The cable entry device of claim 1 including a raised peripheral wall extending from said rear side of said elongated base.

8. The cable entry device of claim 7 wherein said raised peripheral wall and said cable shield form a cavity at said rear side of said base, said cavity enabling said cable shield to accommodate an electrical fitting therein.

9. The cable entry device of claim 1 wherein said recessed area is an arcuate shape.

10. The cable entry device of claim 1 wherein said cable entry device is molded in one piece of plastic.

11. The cable entry device of claim 10 wherein said plastic is selected from the group including polycarbonate, polyvinyl chloride, acrylonitrile-butadiene styrene, and polyethylene.

* * * * *